US007664945B2

(12) United States Patent
Ueno et al.

(10) Patent No.: US 7,664,945 B2
(45) Date of Patent: Feb. 16, 2010

(54) COMPUTER SYSTEM FOR BOOTING A DISKLESS SERVER AFTER A FAULT BY READING A BOOT LOADER FROM A MAINTENANCE LOGICAL UNIT AND IDENTIFYING A BOOT FILE BASED ON IDENTIFIER OF DISKLESS SERVER

(75) Inventors: Hitoshi Ueno, Atsugi (JP); Kouji Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/186,407

(22) Filed: Aug. 5, 2008

(65) Prior Publication Data

US 2008/0307216 A1    Dec. 11, 2008

Related U.S. Application Data

(63) Continuation of application No. 11/133,666, filed on May 19, 2005, now abandoned.

(30) Foreign Application Priority Data

Mar. 18, 2005    (JP)    ............................... 2005-078366

(51) Int. Cl.
*G06F 15/177*    (2006.01)
(52) U.S. Cl. ............................................. 713/2; 714/2
(58) Field of Classification Search ...................... 713/2; 714/2, 6

See application file for complete search history.

(56) References Cited

U.S. PATENT DOCUMENTS 7,120,823 B2 * 10/2006 Foster et al. .................... 714/6
7,370,234 B2 *  5/2008 Stakutis et al. ................ 714/15
2005/0021727 A1  1/2005 Matsunami et al.

* cited by examiner

*Primary Examiner*—Albert Wang
(74) *Attorney, Agent, or Firm*—Townsend and Townsend and Crew LLP (57) ABSTRACT

In investigating the cause of a fault in a computer storage system, it is considered useful to previously prepare maintenance logical units (LUs) of a simple structure, the operation of which has been confirmed. If the same number of LUs as servers are prepared for each server as in the prior art, the efficiency is low. Furthermore, securing these LUs complicates assignment of the LUs for construction of a system and a work for addressing the fault. The present invention provides a computer system free of these problems. The computer system has a first computer for executing a first OS (operating system), a second computer for executing a second OS, and a storage array system. The storage array system uses a disk device having a logical unit (LU) for storing a boot loader, as well as the first and second OSes. The boot loader is executed on any one of the two computers, reads in any of the OSes corresponding to the currently operating computer into this operating computer, and executes the read OS.

5 Claims, 12 Drawing Sheets

CPU NUMBER DECISION TABLE

| CPU NO. | DISK IF ADDRESS OF CPU |
|---|---|
| 1 | DISK IF ADDRESS OF CPU1 — 902-1 |
| 2 | DISK IF ADDRESS OF CPU2 — 902-2 |
| ⋮ | ⋮ |
| n | DISK IF ADDRESS OF CPUn — 902-n |

COMPUTER SYSTEM FOR BOOTING A DISKLESS SERVER AFTER A FAULT BY READING A BOOT LOADER FROM A MAINTENANCE LOGICAL UNIT AND IDENTIFYING A BOOT FILE BASED ON IDENTIFIER OF DISKLESS SERVER

CROSS-REFERENCE TO RELATED APPLICATIONS

This application is a continuation of U.S. Ser. No. 11/133,666, filed on May 19, 2005 now abandoned and which relates to and claims priority from Japanese Patent Application No. 2005-78366, filed on Mar. 18, 2005.

BACKGROUND OF THE INVENTION

1. Field of the Invention

The present invention relates to assignment of volumes (also known as logical units (LUs)) within a storage array system to servers.

2. Description of the Related Art

In recent years, processors have improved in performance and decreased in size. Concomitantly, development of blade server products each comprising a chassis on which a multiplicity of servers are installed is in progress. Such small-sized servers are not large enough to mount a disk device in each individual server. Therefore, a diskless server incorporating no disk device is frequently adopted. That is, each server is connected with a single storage array system via a SAN (storage area network), so that the storage array system is shared among the servers.

The prior art for sharing a single storage array system among plural servers is disclosed in US2005/0021727A1 (JP-A-2000-259583). Also, a technique for dividing the storage area in a disk device into plural partitions and using them is disclosed (see "Partitions and Method of Creating them", [online], searched on Feb. 8, 2005).

SUMMARY OF THE INVENTION

In the technique disclosed in US2005/0021727A1, logical units to be prepared in constructing a system are made to correspond in number with servers.

On the other hand, in the technique disclosed in the above-cited "*Partitions and Method of Creating them*", plural operating systems capable of being executed by one server are stored in one logical unit. The single server can selectively run the operating systems (OSes), i.e., only one necessary OS at a time.

The OS referred to herein consists of programs that must be read in immediately after the power supply of the server is turned on. The OS includes a function of initializing the resources of software and hardware in recognition of variations in configuration among individual servers. Therefore, setup information indicating how individual servers must be set up is necessary. Furthermore, there normally exist application programs which are intrinsic to individual servers and start to operate after the OS is booted on each server. Accordingly, with respect to data sets about individual servers, they are preferably stored in their respective logical units for the servers.

On the other hand, if an error occurs in the system and a certain server cannot be activated, it is necessary to investigate the cause of the inability of activation. For this purpose, use of some OS and an application program is necessary. However, a situation in which the OS cannot be booted by the error may take place. Under these circumstances, it is considered that it is useful to previously prepare a maintenance logical unit having a simple structure in which an OS proved to be operable is stored. This is not taken into consideration in the above-described prior art techniques.

In addition, the maintenance logical unit is only required to have a simple structure for checking of operation. Therefore, if logical units corresponding in number with servers are prepared for each server as in the above-described prior art, the efficiency is low. There is the problem that securing these logical units complicates assigning logical units for creating a system used in practice or carrying out the countermeasure against the fault.

One preferred embodiment of the present invention which solves the aforementioned problem lies in a computer system having a first computer for executing a first OS, a second computer for executing a second OS, and a storage array system. The computer system further includes a disk device having a logical unit (LU) in which a boot loader is stored, as well as the first and second OSes. The boot loader is executed on any one of the first and second computers. Any one of the first and second OSes which corresponds to the currently operating computer is read into this computer, where the read OS is executed.

Another preferred embodiment of the present invention lies in a computer system having a first computer, a second computer, a storage array system, and a disk device. This disk device has first, second, and third logical units (LUs). An OS executed by the first computer is stored in the first logical unit. An OS executed by the second computer is stored in the second logical unit. The OSes executed by the first and second computers, respectively, are stored in the third logical unit. The first computer selectively boots the OSes stored in the first and third logical units, respectively, one OS at a time. The second computer selectively boots the OSes stored in the second and third logical units, respectively, one OS at a time.

DESCRIPTION OF THE PREFERRED EMBODIMENTS

Embodiments of the present invention are hereinafter described.

Figure 1:
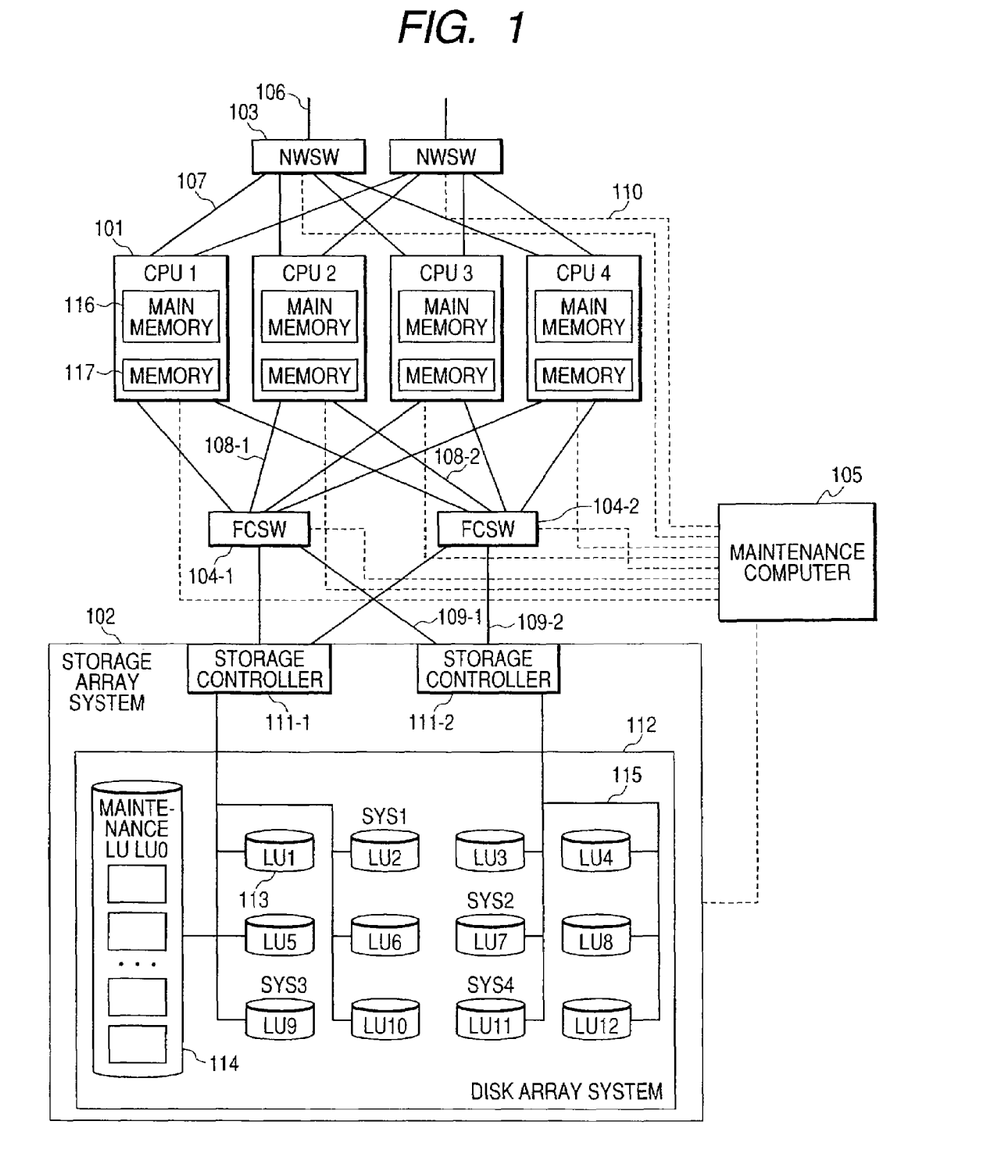
FIG. 1 is a block diagram of the whole configuration of a computer system.

FIG. 1 shows a computer system for implementing the present invention. The computer system is composed of a plurality of CPUs 101 (CPU1 to CPU4), a storage array system (SAS) 102, a network switch (NWSW) 103, a fibre channel switch (FCSW) 104, a computer 105 for maintenance, a host network connection path 106, an NWSW-CPU path 107, a CPU-FCSW path 108, an FCSW-SAS path 109, and a path 110 (indicated by the broken lines) for the maintenance computer.

Each CPU 101 is a diskless server and has a main memory 116 and a non-volatile memory 117 (e.g., a ROM (read-only memory)). The same memory may have volatile and non-volatile areas.

A BIOS (basic input/output system) that is a program for controlling peripheries connected with the computer is stored in the memory 117. The network switch (NWSW) is duplexed for connection with a host network.

The storage array system 102 consists of a storage controller 111 and a disk array system 112, and is shared among the plural CPUs 101. Generally, the disk array system 112 comprises magnetic storage media. Other storage media such as optical storage media may also be used. The logical configurations within the disk array system 112 are shown. The inside consists of plural logical units (LU1 to LU12) 113, a maintenance logical unit (LU0) 114, and a path 115 inside the storage array system. Obviously, plural disk array systems may be physically connected with the storage controller.

In FIG. 1, SYS1 means that the logical unit LU2 is the system volume of the CPU1. Similarly, SYS2 (LU7), SYS3 (LU9), and SYS4 (LU11) are the system volumes of CPU2, CPU3, and CPU4, respectively.

A system volume referred herein is a logical unit (LU) containing a portion forming the bare minimum of the system disk and files necessary for operation of applications. A system disk referred to herein is a logical unit containing a file necessary to boot an OS. The system disk is conceptually narrower than the system volume but they hardly differ, because application-related files can exist on the system disk. In practice, the term "system disk" is used in the field related to OS booting techniques. The "system volume" is used in fields close to applications in computer use. Throughout the present specification, the term "system logical unit (LU)" is used. A maintenance logical unit (LU) is a kind of system logical unit and means a volume in which an OS and files necessary for maintenance of the computer system such as an application program for setting the system and an application program for checking the operation are stored.

For example, in order to boot the CPU2 and to make the system logical unit (LU7) accessible, it is necessary to set the fibre channel switches (FCSWes) 104-1 and 104-2 and storage array system 102 such that access to the LU7 can be gained from the CPU2 via the path 108-1, FCSW 104-1, path 109-1, and storage controller 111-2 or via the path 108-2, FCSW 104-2, and path 109-2. One of the items set regarding the fibre channel switch (FCSW) 104 pertains to zoning that determines which port of the fibre channel switch is made communicable to which. The setup may be so made that accesses among every port are granted. One of the setup items regarding access to the storage array system 102 pertains to LUN management that determines which logical unit (LU) can access from which CPU. The setup may be so made that access to the LU7 is granted to only the CPU2. The setting operation is carried out by the system's administrator from the maintenance computer 105 via the path 110. If these setups have been already done, the BIOS is activated when the power supply of the CPU2 is turned on or reset. Booting from the LU7 is started. The booting is a sequence of processing performed automatically since the power supply of the computer is turned on by the human operator until the computer is made controllable. The booting is also known as initial program load.

Figure 2:
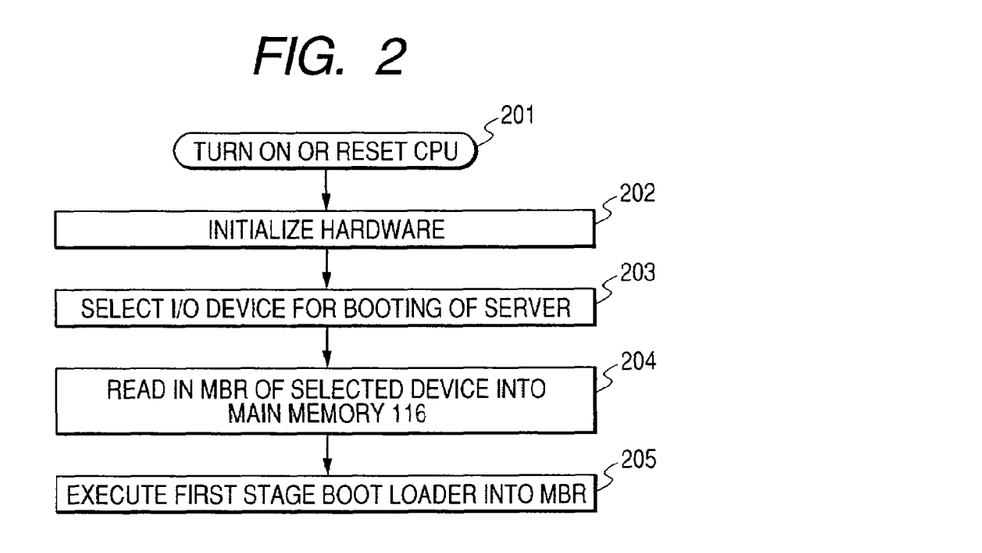
FIG. 2 is a flowchart illustrating a BIOS.

FIG. 2 illustrates the flow of control in the BIOS executed by each CPU 101. When the power supply of the CPU 101 is turned on or reset (201), the CPU 101 executes the BIOS. Then, the CPU initializes the hardware (such as setting of registers for controlling the peripheries) (202). An input/output device for executing the booting is selected (203). Options include a floppy disk and a CD-ROM (not shown), as well as the system LU inside the storage array system 102. The control table (master boot record (MBR)) existing at the first sector (section) of the selected device is read into the main memory 116 (204). The first stage loader that is the program stored in an area within the master boot record (MBR) is executed (205).

Figure 5:
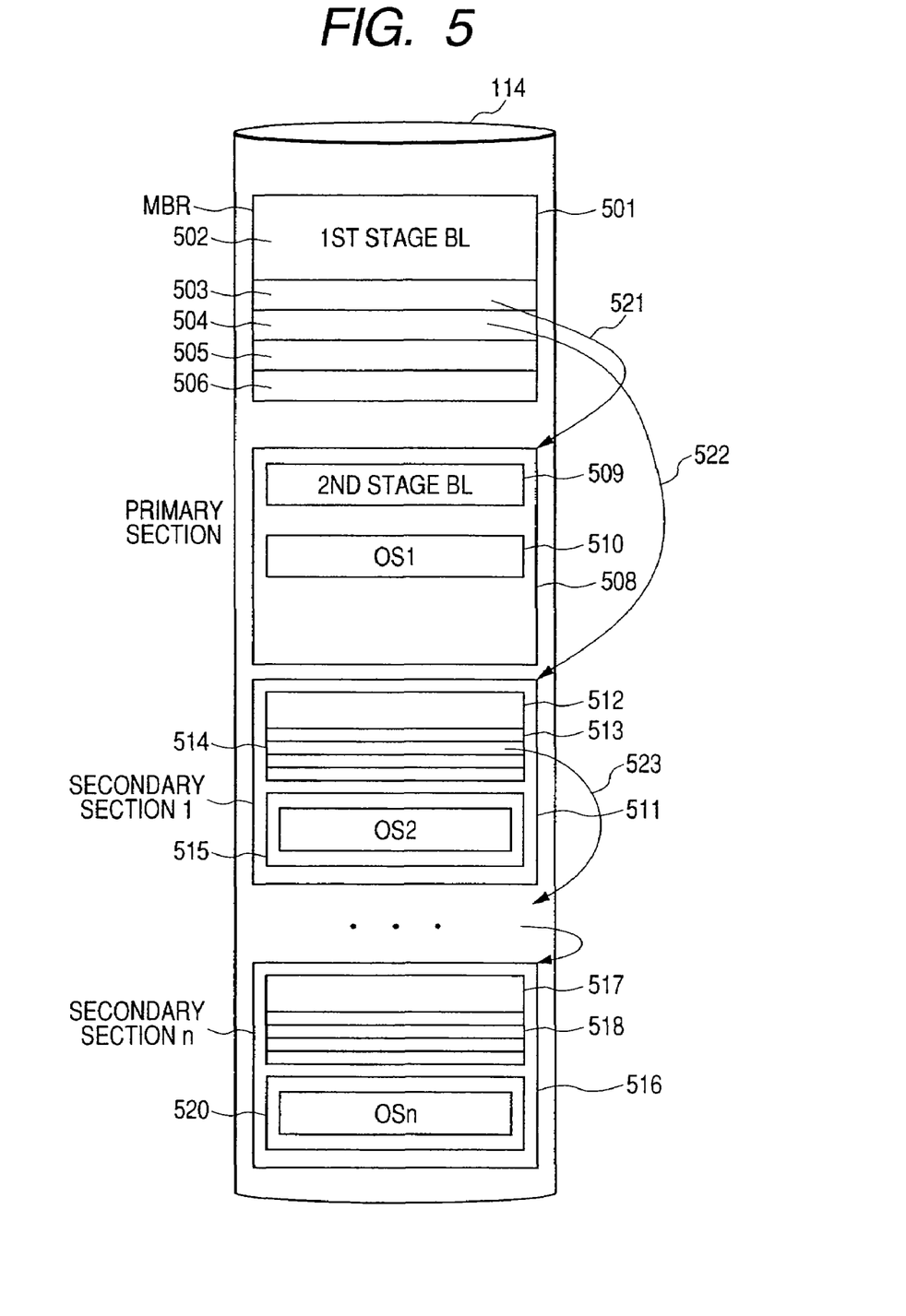
FIG. 5 is a diagram showing an example of configuration of a logical unit (LU)

FIG. 5 shows an example of configuration of an LU. That is, plural partitions are defined within the single logical unit (LU) 114.

A partition referred to herein is a unit of managed area. When the inside of a logical unit (LU) is divided into plural partitions, the OS operated by the CPU 101 can manipulate each partition as if it were a separate logical unit. When the OS is booted, a file system is configured within the logical unit. If a logical unit in which the concept of partitions does not exist is assumed, only one file system can be configured within this logical unit. If plural partitions are defined within a logical unit, a separate file system can be configured in each individual partition. Furthermore, a separate OS can be installed in each partition. The partitions are defined by the master boot record (MBR), and are mechanisms, access to which can be controlled by the OS. In the past, the partitions have provided a concept of control which is provided by software but which is incapable of being recognized by a disk device.

Partitions include two kinds: primary section (primary partition) and secondary sections (extended partitions). The primary partition can be directly defined by the partition table within the MBR. An extended partition is created by pointing to a separate extended partition table from the MBR and defining the extended partition there. Only the primary partition may be set in the MBR or both primary and extended partitions may be set. In the field of disk devices, partitioned storage areas are customarily called "partitions" in that they are defined by the partition table. In the technical field of software, they are customarily called "primary section" (identical with the primary partition) and "secondary section" (identical with the extended partition), respectively, from a viewpoint of the method of installing an OS. In the present specification, partitions are referred to as sections. Areas obtained by dividing one section (partition) are referred to as subsections to which numerals are assigned to discriminate between them.

Examples of OS stored in these sections are Linux, Windows, HP-UX, and Solaris. The invention is not limited to them.

An MBR (master boot record) 501 is placed in the first sector of each logical unit and includes a section 502 in which the first stage boot loader is stored and four sections 503, 504, 505, and 506 in which the first position of each section obtained by dividing the inside of a single logical unit and the volume of the section used under control of software are stored. These four sections are collectively referred to as a partition table.

Figure 6:
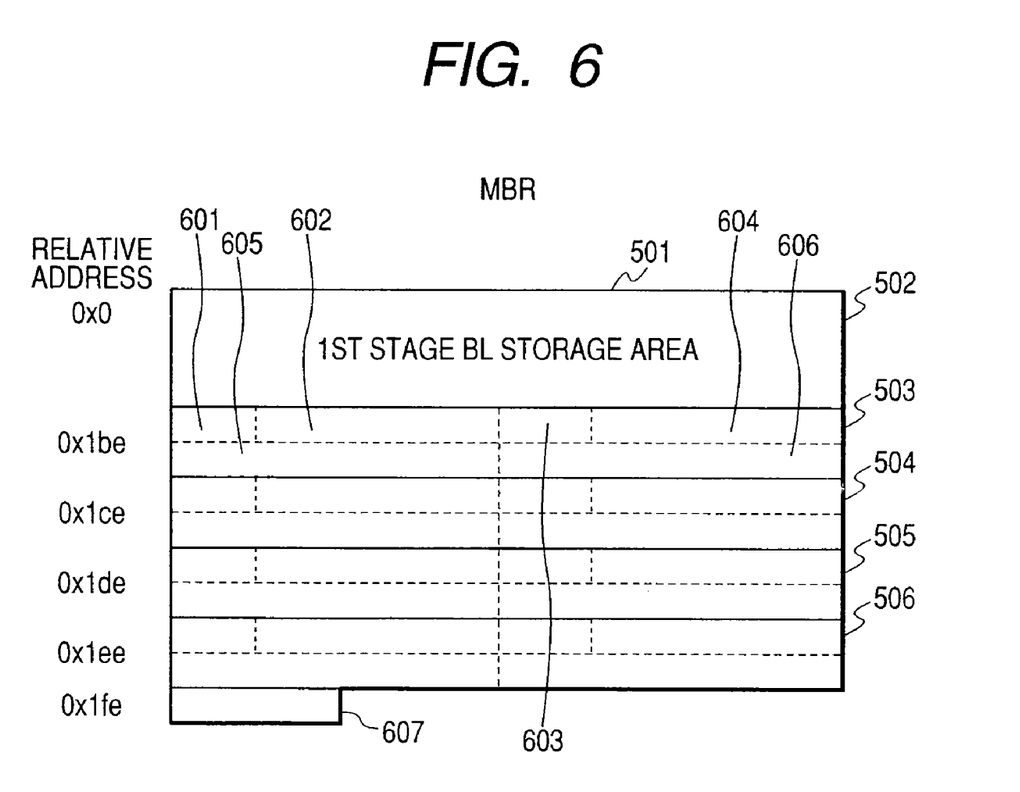
FIG. 6 is a diagram particularly illustrating a master boot record (MBR)

FIG. 6 particularly illustrates the MBR 501, which is 512 bytes in total length. The MBR 501 is composed of the section 502 of 446 bytes, the sections 503, 504, 505, and 506 each of 16 bytes, and a boot signature section 607 of 2 bytes. The total length of the four sections 503-506 is 64 bytes. Each of the sections (sectors) 503, 504, 505, and 506 comprises a boot flag 601 of 1 byte, a sector start position 802 of 3 bytes represented by the CHS (Cylinder, Head, Sector) notation, sector type 603 of 1 byte, sector end position 604 of 3 bytes by the CHS (Cylinder, Head, Sector) notation, sector start position 605 of 4 bytes by the LBA (local block address) notation, and sector capacity 606 of 4 bytes by the LBA notation.

The boot flag 601 indicates whether the present section is bootable or not. If the value is 0x80, the section is bootable. If the value is 0x00, the section is unbootable.

The section type 603 indicates what OS is used with the disk format of this section. For example, if the value is 0x04, the type is FAT16 used in MS-DOS OS. If the value is 0x83, the type is EXT2 used in Linux OS. Where the section type points to a secondary section (extended partition), any one of the values 0x05, 0x0F, and 0x85 is assumed. Also, information indicating whether this logical unit (LU) is a "multiple bootable LU" (described later) is included.

The boot signature 607 assumes a value of oxAA55, indicating that the MBR is effective.

In a general computer system, an MBR should exist at the first sector of each logical unit (LU). In a logical unit obtained by formatting with a special OS, no MBR may be present. In this OS adopting a management system at which the present embodiment is not directed, what value is at the position of the boot signature of the MBR is not assured. Generally, it is unlikely that a value of 0xAA55 is present there by accident. Therefore, it is judged according to the presence of this value that the MBR is stored in correct format. According to this definition, there is the slightest danger that a section different from the MBR is misjudged as an MBR. However, it is possible to judge whether it is an MBR or not by detecting whether the format of the table in the MBR is rational or not.

Returning to FIG. 5, the sections 503 and 504 are pointing to the primary section and secondary section 1, respectively (521 and 522). It is assumed that secondary sections 1 to n are defined. Sections 505 and 506 are empty entries and are not used. An extended partition boot record (EPBR) 512 having the same format as the MBR 501 is stored at the first position within the secondary section. The sections within the EPBR 512 are not used. The first entry 513 in the secondary section 1 indicates the first position of a subsection 515 in the secondary section 1 (511) and the capacity. The second entry 514 is pointing to the first position of the secondary section 2 (523). Similar configuration can be repeatedly set in secondary sections. The final secondary section n (516) is similar in configuration with the secondary section 1 (511). The secondary entry 518 of the secondary section n is empty.

The second stage boot loader that is read into the main memory 116 when the CPU executes the first stage boot loader is stored in a subsection 509 within the primary section 508. Using this function, a selection is made as to which of the sections is selected to boot its OS (510, 515, or 520).

Figure 3:
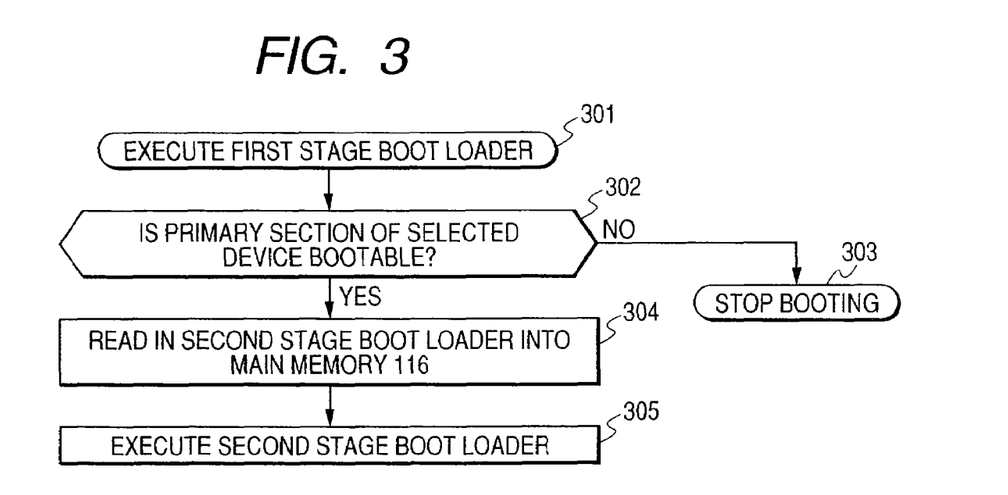
FIG. 3 is a flowchart illustrating a first stage boot loader.

FIG. 3 is a flowchart illustrating the first stage boot loader executed by the CPU 101.

When the CPU 101 starts execution of the first stage boot loader (301), the CPU inspects the information inside the section 503 within the MBR 501. A decision is made as to whether a flag 0x80 indicating bootability is set in the boot flag 601 (302). Booting processing is interrupted if the flag is not set (303). If the flag is set, the second stage boot loader stored in the subsection 509 within the primary section is read into the main memory 116 (304). Finally, the second stage boot loader read in is executed (305).

Figure 4:
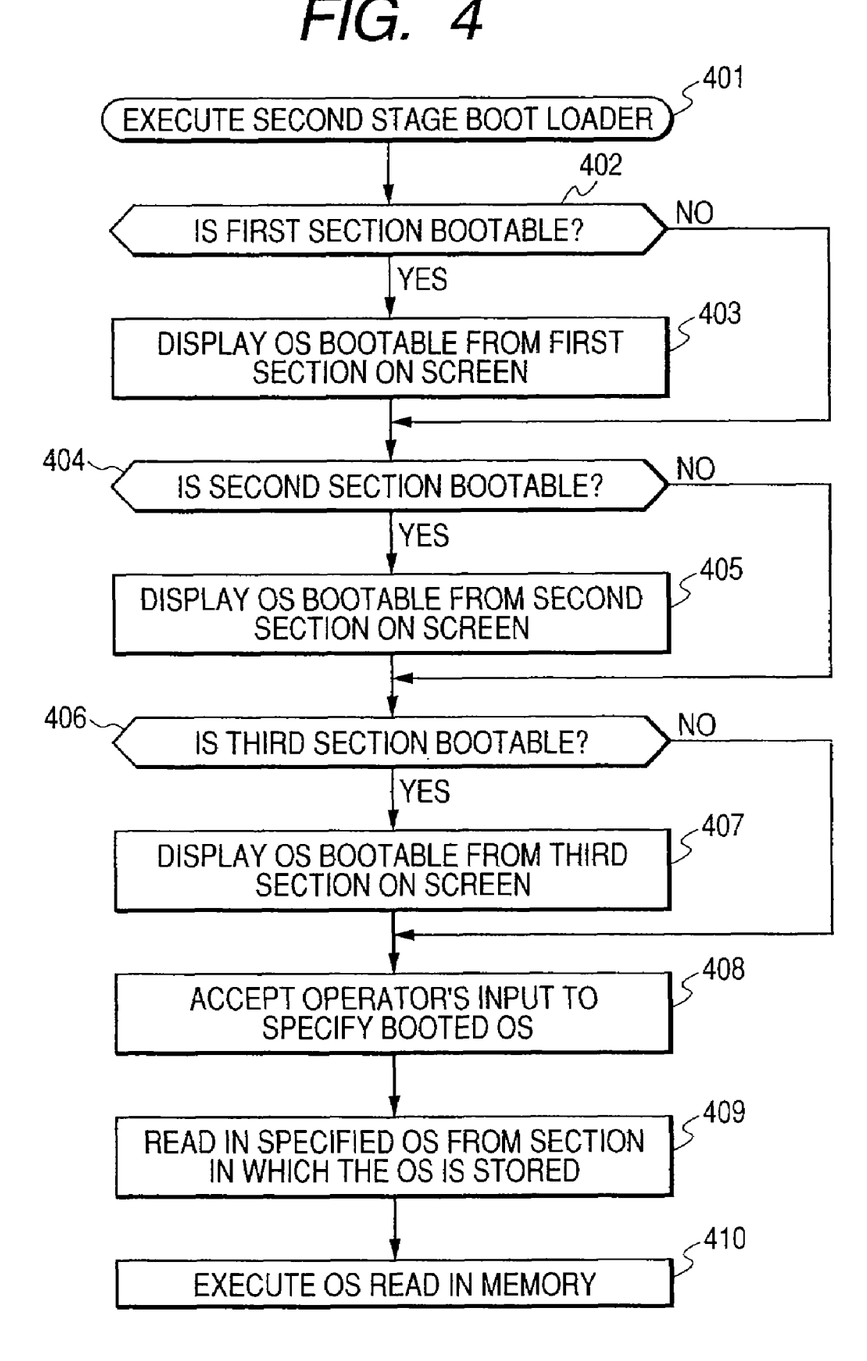
FIG. 4 is a flowchart illustrating a second stage boot loader.

FIG. 4 is a flowchart illustrating the flow of control in the second stage boot loader executed by the CPU 101. When execution of the second stage boot loader is started (401), the CPU 101 checks if a bootable OS is present in each section of the logical unit (LU). A list of the results is presented on the manipulation viewing screen for the operator (e.g., system administrator). The CPU waits for an entry of an operator's instruction. Depending on the second stage boot loader, all the sections or a certain number of sections are checked. In this example, the sections are checked up to the third section. With respect to the viewing screen for manipulations, the screen may be fitted as a display device dedicated for each CPU or temporarily connected only when the user makes manipulations.

The CPU first checks if the primary section 508 (first section) is bootable (402). If so, the type of the OS and the number used when the operator makes an entry for indication are displayed on the manipulation viewing screen (403). The CPU goes to inspection of the secondary section 1 (second section) (511). If the primary section is not bootable, the information is not displayed and the CPU goes to inspection of the second section.

Then, a decision is made as to whether the second section is bootable (404). Processing similar to the processing regarding the first section is carried out (405). Processing regarding the next third section is similarly performed (406 and 407).

Then, an operator's input is accepted (408). The specified OS is read into the main memory 116 from the section in which the OS is stored (409). The read OS is executed (410).

During the processing steps described above, when the ith section is referenced, it is necessary to search for the pointer directed from the section of the MBR 501 to a secondary section (EPBRs 512 and 517). The number of accesses to the disk device increases in association with the number of sections.

Figure 8:
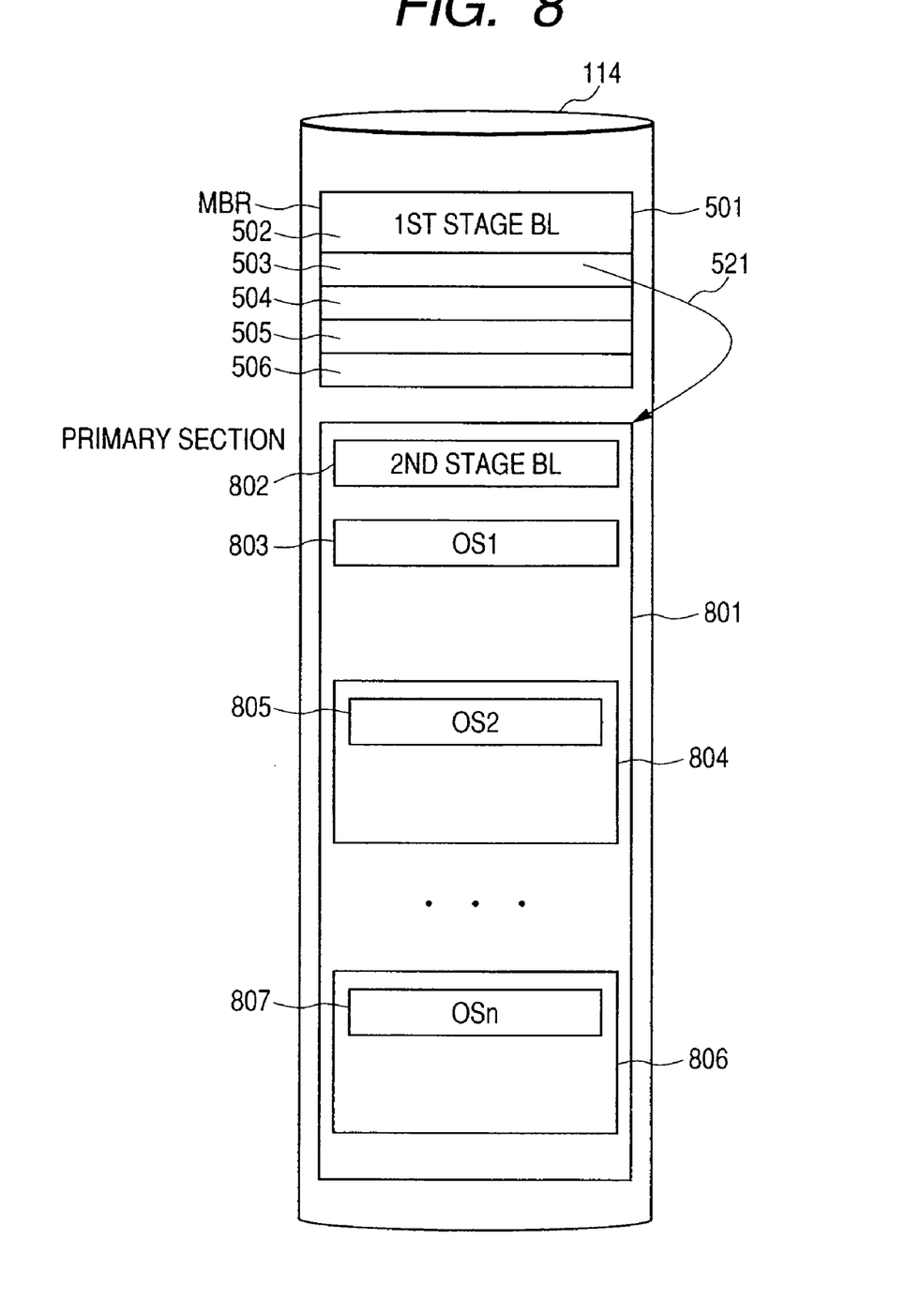
FIG. 8 is a diagram illustrating another example of configuration of a logical unit.

FIG. 8 shows an example of configuration of the maintenance logical unit (LU) 114. In this case, the MBR 501 points to only one primary section (521). There are no secondary sections. The inside of the primary section 801 is formatted as a file system that is managed by executing the OS1 (803). Sections for storing other operating systems OS2 (805) to OSn (807) are created in this file system. Where there is an OS of the same type as the OS1 (803), sections can be created as subdirectories (e.g., a directory for CPUi is /bootdir/i/) of the file system under control of the OS1. Where an OS different in type from the OS1 (803) is used, sections 804 and 806 are secured as physically successive sections, and one section is created as one file (e.g., a file for CPUi is /bootdir/OSfile-i) under the OS1 file system.

Figure 7:
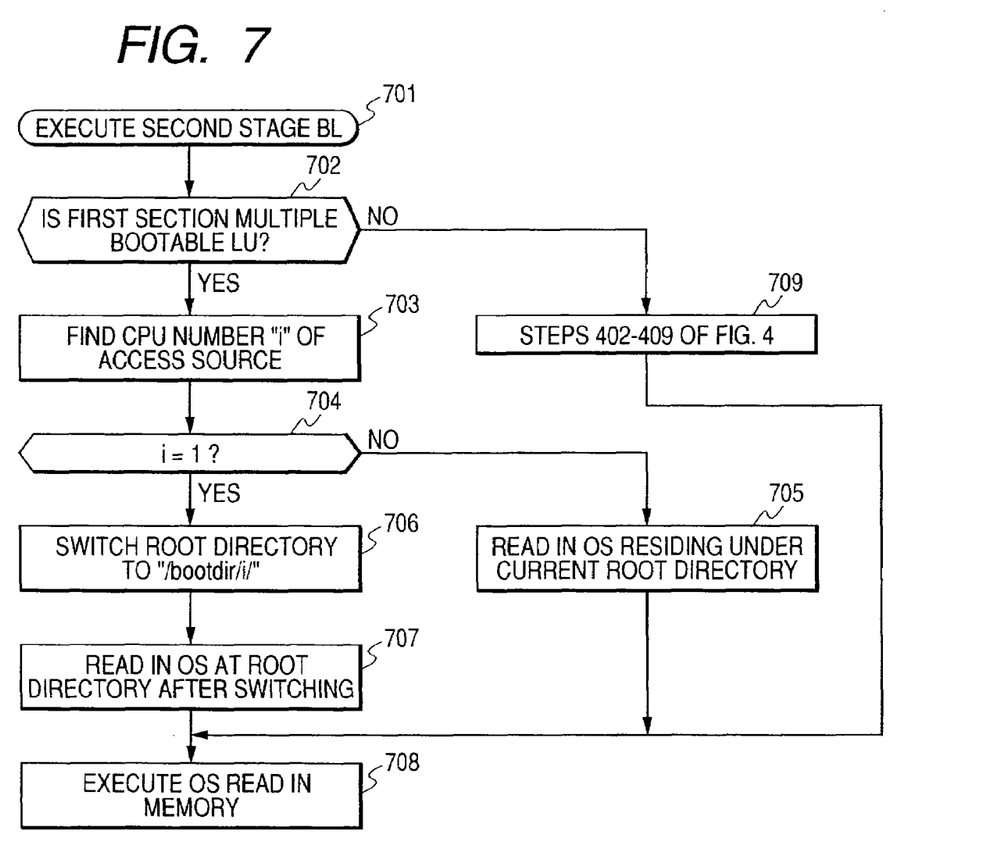
FIG. 7 is another flowchart of the second stage boot loader.

FIG. 7 is a flowchart illustrating the flow of control in the second stage boot loader executed by the CPU 101 in a case where the maintenance LU of FIG. 8 is created. It is assumed that the OS1 in FIG. 8 corresponds to the CPUi.

Activation of the second stage boot loader is triggered in the same way as already described in connection with FIG. 4 (701). Where the section type 603 of the primary section is "multiple bootable LU" shown in FIG. 8, control jumps to step 703. If not so, control jumps to step 402, and the processing of steps 402-409 of FIG. 4 is carried out. The multiple bootable LU is a logical unit (LU) in which plural OSes to be booted are stored in the primary section. That is, this is the LU shown in FIG. 8. Where only the LU shown in FIG. 8 is used, processing of steps 702 and 402-409 is unnecessary.

In the case of the logical unit (LU) shown in FIG. 8, the CPU 101 finds its own CPU number (identifier) i (703). The CPU number referred to herein means a number such as 1 to 4 given to the CPUs 101 shown in FIG. 1. A method of finding the CPU number consists of reading in a value set by a switch from addresses in a predetermined I/O space or a value stored in the memory 117 as a CPU number. Another method consists of reading in a World Wide Name (WWN) of a port of the FC cable with which the present CPU is connected, creating a table indicating the CPU number possessed by the WWN, and calculating the CPU number from the table.

In a case where i=1, there exists an OS in the primary section and so the OS existing under the present root directory is directly read into the main memory 116 (705). Control is passed to the OS (410). Where i≠1, there exists an OS under the file system in the primary section. Therefore, the root directory is switched to the directory (e.g., /bootdir/i/) in which the OS for the CPUi exists (706). The OS under the root directory after the switching is read into the main memory 116 (707). Control is passed to the OS (708).

In this way, when an arbitrary OS is specified, a file name located under the file system can be specified and an access be made. Therefore, an OS can be booted more efficiently than where a method of searching for an MBR or EPBR is used. Furthermore, individual OS sections can be manipulated as files under different OSes and so in a case where the CPU cannot be operated, it can be manipulated by gaining an access to the corresponding OS section from another CPU. This is advantageous in taking a countermeasure against a fault.

Embodiment 2

Figure 10:
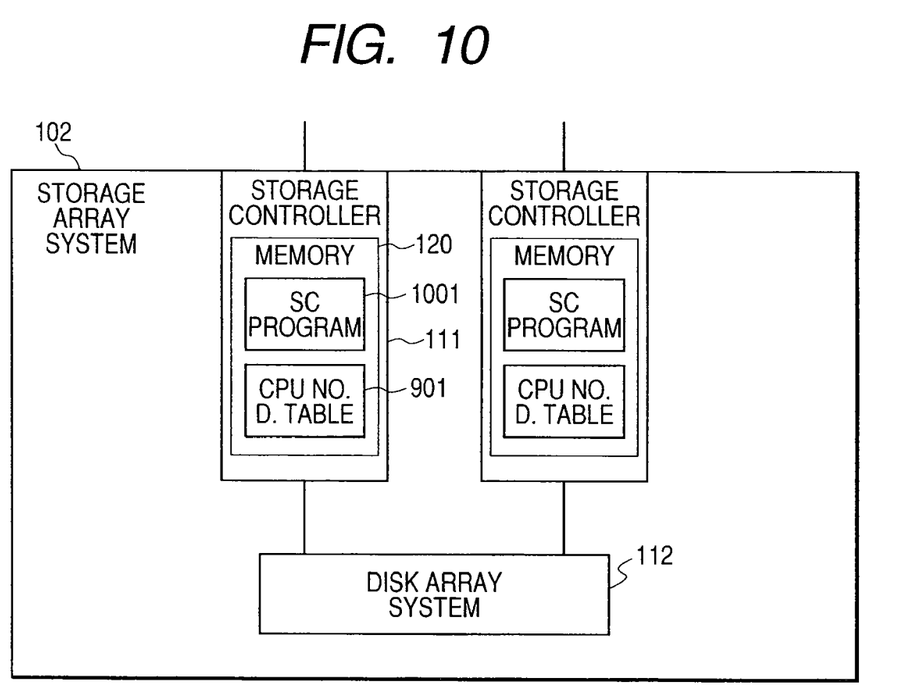
FIG. 10 is a diagram of the whole configuration of a computer system according to Embodiment 2 of the invention.

In Embodiment 2 of the invention, plural OSes are booted using the logical unit (LU) shown in FIG. 5. FIG. 10 shows a storage array system 102 according to Embodiment 2. The present embodiment is characterized in that a section-converting program (SC program) 1001 and a CPU number decision table 901 are loaded in a non-volatile memory 120 as consisting of a ROM within a storage controller 111. The system is similar to the system shown in FIG. 1 in the other respects.

Figure 11:
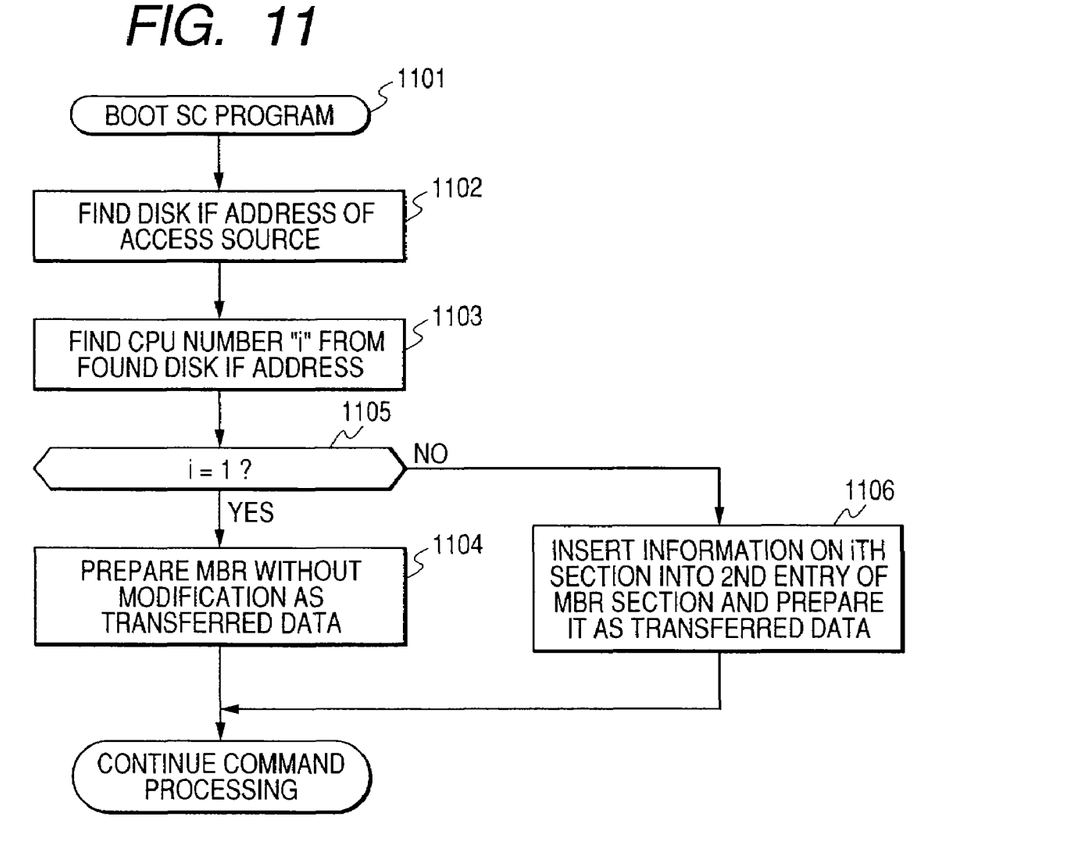
FIG. 11 is a flowchart illustrating a section-converting program.

FIG. 11 is a flowchart illustrating the flow of control when the storage controller 111 executes the section-converting program 1201 to convert each read/write access from the CPU 101 to the memory array system 102 into an intersection access corresponding to the CPU number given to the access source. It is also assumed that OSi corresponds to CPUi.

When an access request from the CPU 101 is directed at LU0, if the LU0 has been previously specified as the maintenance LU, and if the access is directed at the sector (section) in which the MBR 501 is stored, then the section-converting program 1001 is activated (1101).

The disk interface address (e.g., in a case of FC connection, the WWN of the FC port on the CPU side) of the accessing CPU is found (1102). The CPU number i is found from the found value using the CPU number decision table 901 shown in FIG. 9 (1103). Where i=1, an access to the primary section is being made and so data to be transferred to the CPU is prepared as transferred data without modification (1104). Where i≠1, information such as the first address of the section corresponding to the found i and volume is stored in the section 504 of the MBR 501. The information is prepared as data to be transferred to the CPU (1106). A method of finding information about the section corresponding to the CPU number consists of causing the storage controller 111 to search for the MBR and EPBR. Another method consists of previously storing information about the sections for the individual CPUs in the memory 120 on initialization of the memory array system 102 and reading out the information as the need arises.

Figure 9:
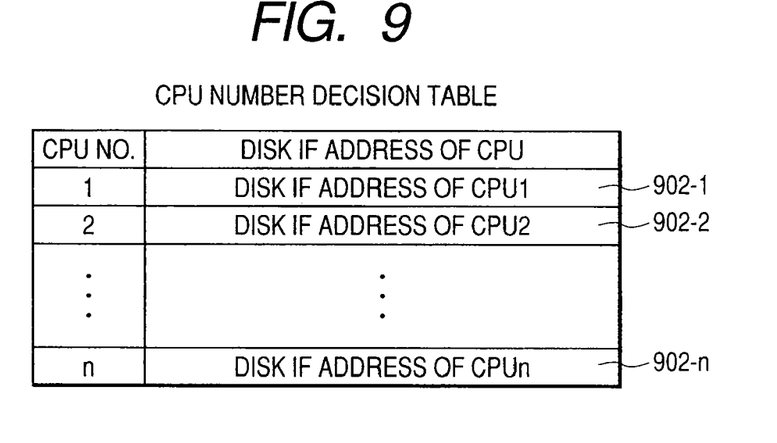
FIG. 9 is a diagram illustrating an example of configuration of a table used to judge CPU numbers.

FIG. 9 shows an example of configuration of the CPU number decision table 901. This table holds CPU-side disk interface address storage section 902 of 1 entry for each CPU. The CPU 101 executes the section-converting program 1001, compares the interface addresses from the first item of the table in succession with a reference address, and determines the CPU number obtained when a coincident section is found as the accessing CPU.

In this way, booting of specified plural CPUs can be done simply by issuing an instruction to boot the CPUs from a common system LU.

Figure 12:
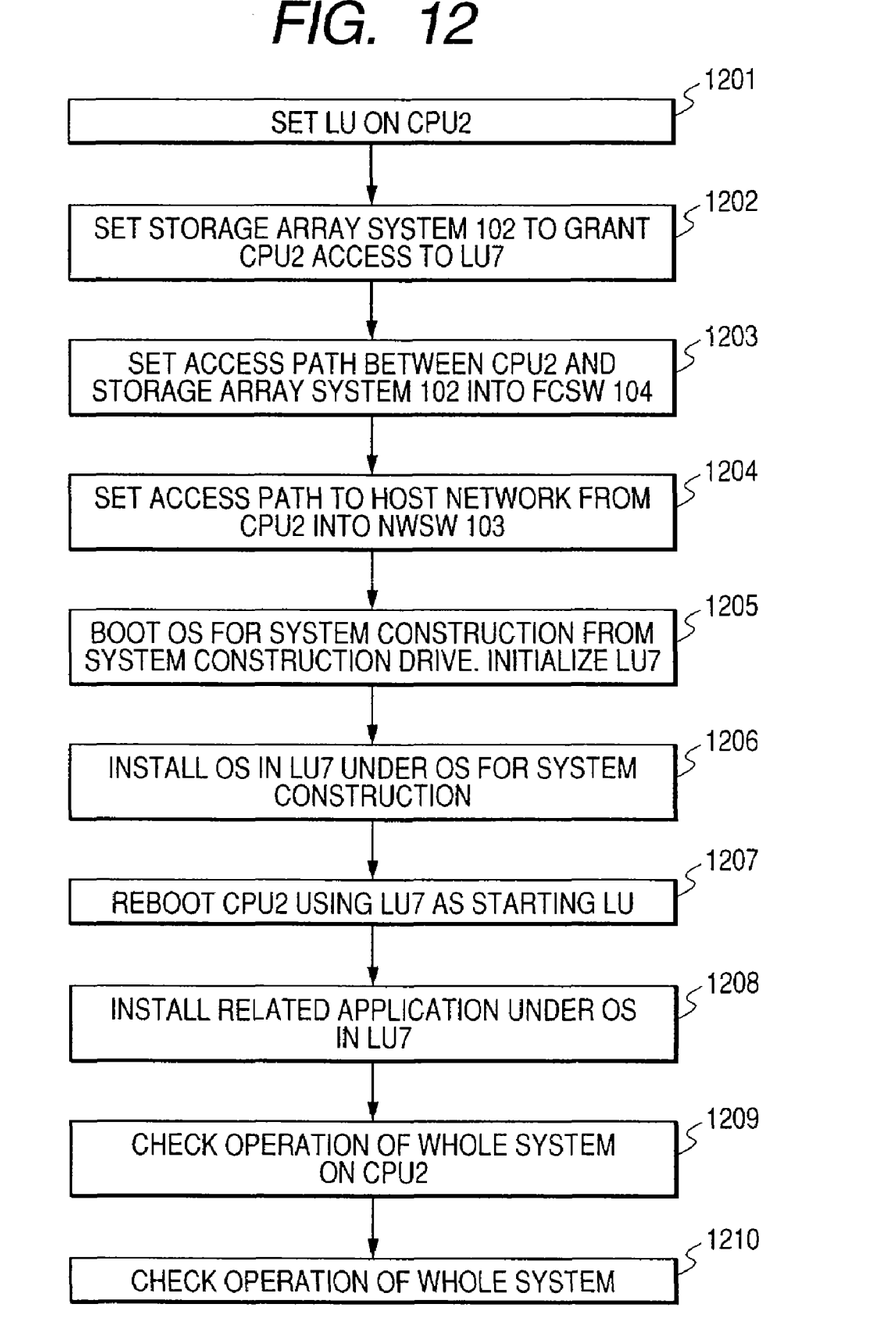
FIG. 12 is a flowchart illustrating a work for configurating a system.

FIG. 12 is a flowchart illustrating the flow of control when a work for constructing a system is performed. To assign the storage units within the storage array system 102, the operator sets the capacity of the system LU (LU7 (113)) for actual use of the CPU2 and the RAID group to which the CPU belongs from the maintenance computer 105 via the path 110 regarding the CPU2, for example (1201).

The operator then makes a setup to grant the CPU2 an access to the LU7 (113), using the LUN Management function of the storage array system 102 (1202). Furthermore, an access path between the CPU2 and storage array system 102 is set into the FCSW 104 (1203). An access path between the CPU2 and the host network is set into the NWSW 103 (1204).

Then, a device for constructing a system such as a CD-ROM is connected with the CPU2, and the OS for constructing the system is booted from this device. The LU7 (113) is initialized (1205). The OS is installed in the LU7 under the OS for constructing the system (1206). The CPU2 is rebooted as the system LU for booting the LU7 (1207). A related application program is installed under the OS in the LU7 (1208). The operation of the whole system regarding the CPU2 is checked (1209). Finally, the operation of the whole system is checked (1210).

Figure 13:
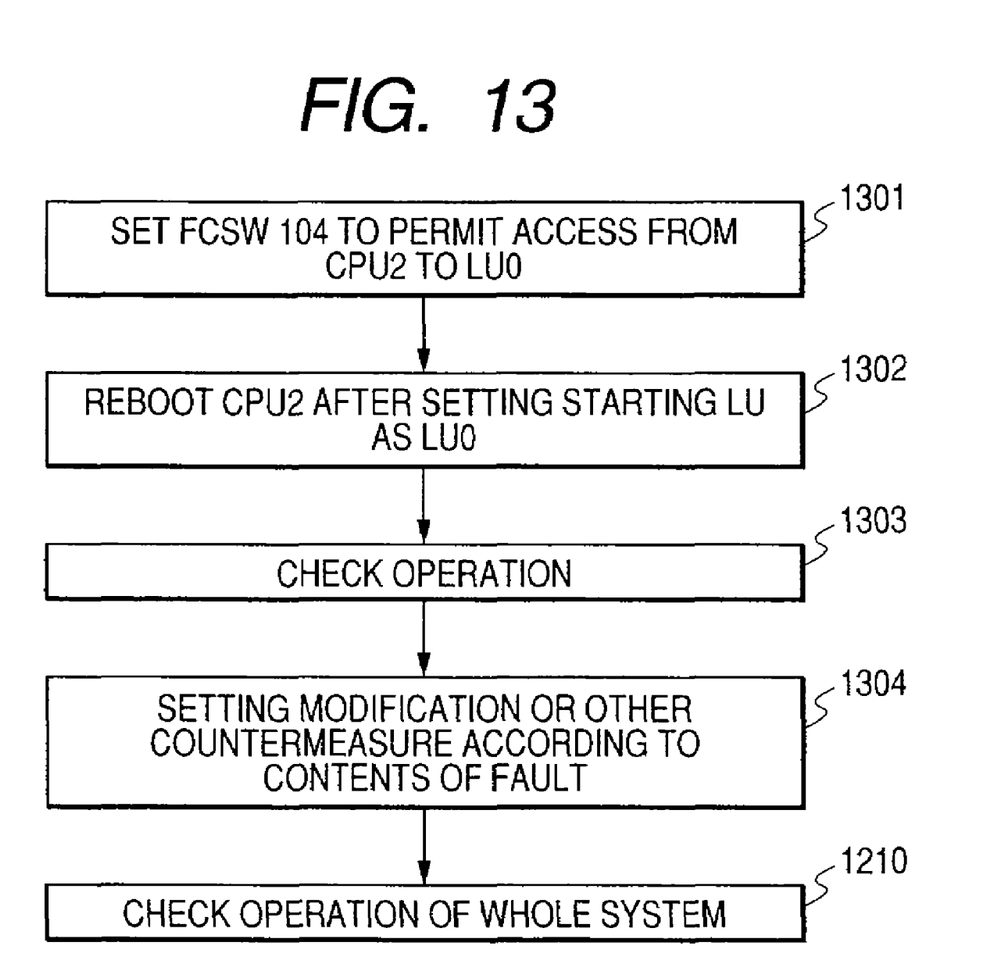
FIG. 13 is a flowchart illustrating operations performed when a fault occurs in a system being configured.

FIG. 13 is a flowchart illustrating the flow of control in a case where a fault occurs in the system being constructed as shown in FIG. 12. As faults associated with disk devices, the following cases may take place.

(1) The LU7 cannot be initialized during execution of step 1205.

(2) The OS cannot be installed during execution of step 1206.

(3) The OS cannot be booted from the LU7 during execution of step 1207.

(4) An application program cannot be installed during execution of step 1208.

(5) Normal operation is not performed during execution of step 1209.

If any of the above-described faults occurs, a work for inspecting the fault during construction of the system is carried out. First, the FCSW 104 is set to enable access to the maintenance LU (LU0 (114)) from the CPU2 (1301). The system LU is switched to LU0 (114) by BIOS setting of the CPU2, and rebooting is done (1302). If the rebooting is successful, a check of operation is done (1303). An inspection for faults is performed. According to the contents of the fault, a countermeasure such as setting modification is taken (1304).

After the completion of the countermeasure, the operation of the whole system is checked (1210).

Figure 14:
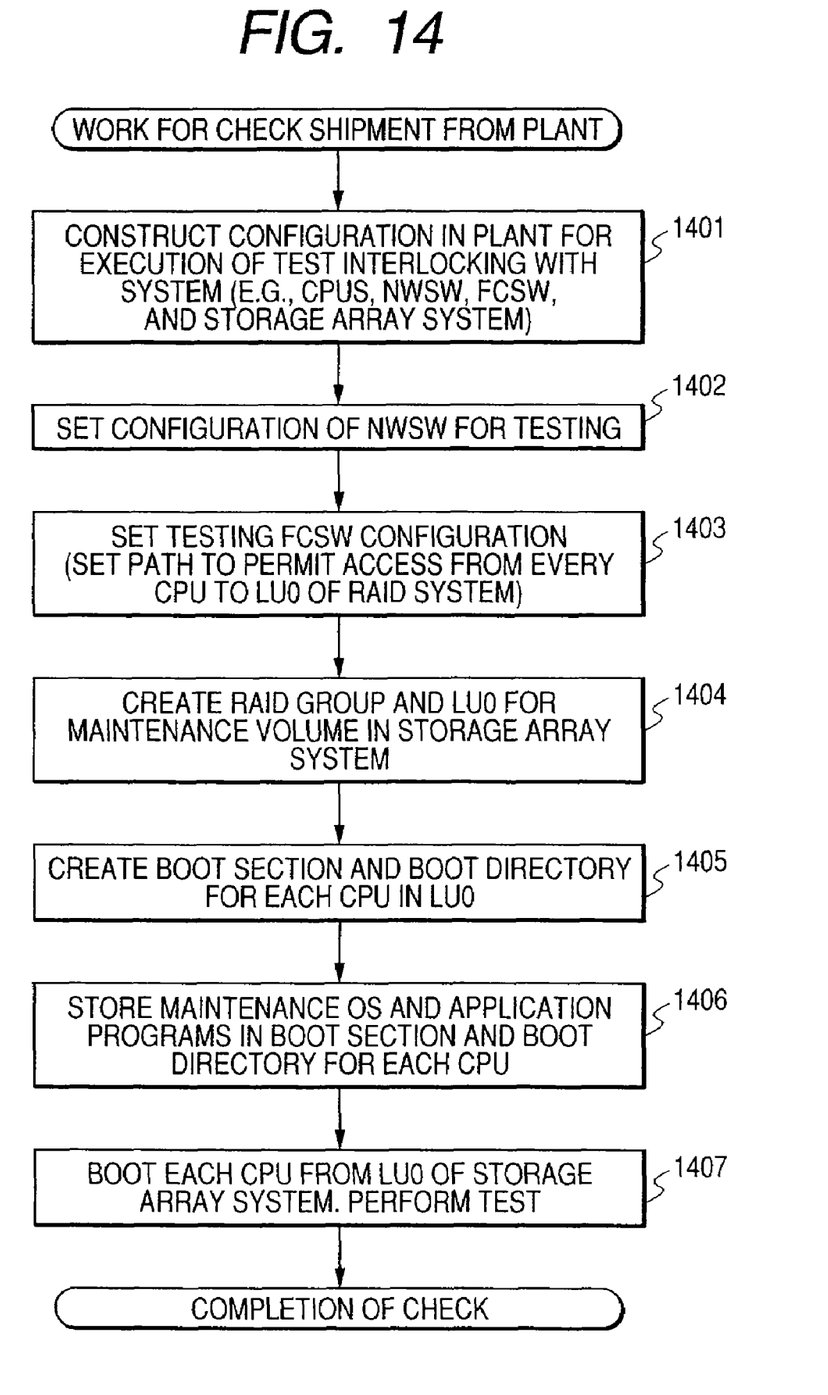
FIG. 14 is a flowchart illustrating a confirmation work done when shipment from a plant is made.

FIG. 14 is a flowchart illustrating a work for checking the system prior to shipment from a plant. First, a configuration for executing a test interlocking with the system is built in the plant (1401). An NWSW configuration for testing is set (1402). The FCSW configuration for testing is so set that all paths are accessible (1403). A RAID group for the maintenance LU and LU0 are created in the storage array system (1404). A boot section or boot directory for each CPU is created in the LU0 (1405). The boot section for each CPU, an OS for maintenance of the boot directories, an application program for checking the operation, and so on are stored (1406). A test is performed by booting each CPU from the LU0 of the storage array system 102 (1407).

Where the maintenance LU is constructed with the single LU in this way, it is easy to perform a check as to whether there is any fault in doing the work for constructing the system. This is also useful during inspections performed when products are shipped.

The program described herein may be transferred from a storage medium such as a CD-ROM. The program may be downloaded from other device through a network.

We claim:

1. A computer system comprising:
   a plurality of diskless servers;
   a storage system coupled to the plurality of diskless servers, having a plurality of logical units storing OSes and applications corresponding to the plurality of diskless servers, and a maintenance logical unit formatted by a file system and storing a bootloader program and a plurality of boot files;
   wherein each of the plurality of boot files includes a maintenance OS and a checking application program corresponding to each of the plurality of diskless servers for use in case of fault associated with the storage system; and
   wherein a certain diskless server, which is one of the plurality of diskless servers related to the fault associated with the storage system, reads the bootloader program from the maintenance logical unit, identifies a certain boot file from the plurality of boot files based on an identifier of the certain diskless server by executing the bootloader program, reads the certain boot file, and executes the maintenance OS and the checking application program stored in the certain boot file.

2. A computer system according to claim 1,
   wherein the certain diskless server executes an OS and an application stored in one of the plurality of logical units before the fault associates with the storage system, and
   wherein the access of the certain diskless server is switched from the one of the plurality of logical units to the maintenance logical unit by changing a configuration of a BIOS of the certain diskless server.

3. A computer system according to claim 2, wherein the maintenance logical unit stores a master boot record having a program causing the certain diskless server to read the bootloader program and to execute the bootloader program.

4. A computer system according to claim 2, wherein an another certain diskless server of the plurality of diskless servers executes an another OS and an another application stored in an another of the plurality of logical units.

5. A computer system according to claim 1, wherein the plurality of diskless server having a plurality of FC ports,
   wherein the identifier of the certain diskless server is based on a World Wide Name of a certain FC port of the plurality of EC ports, which is corresponding to the certain diskless server.

* * * * *